United States Patent
Wescoe et al.

(10) Patent No.: US 10,243,904 B1
(45) Date of Patent: Mar. 26, 2019

(54) DETERMINING AUTHENTICITY OF REPORTED USER ACTION IN CYBERSECURITY RISK ASSESSMENT

(71) Applicant: Wombat Security Technologies, Inc., Pittsburgh, PA (US)

(72) Inventors: Kurt Wescoe, Pittsburgh, PA (US); Trevor T. Hawthorn, Ashburn, VA (US); Alan Himler, Pittsburgh, PA (US); Patrick H. Veverka, Virginia Beach, VA (US); John T. Campbell, Bridgeville, PA (US); Dustin D. Brungart, Imperial, PA (US); Norman Sadeh-Koniecpol, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 0 days.

(21) Appl. No.: 15/607,071

(22) Filed: May 26, 2017

(51) Int. Cl.
*H04L 12/58* (2006.01)
*G06F 21/56* (2013.01)
*H04L 29/06* (2006.01)

(52) U.S. Cl.
CPC .......... *H04L 51/12* (2013.01); *G06F 21/566* (2013.01); *G06F 21/562* (2013.01); *H04L 63/14* (2013.01); *H04L 63/1441* (2013.01)

(58) Field of Classification Search
CPC ..... H04L 51/12; H04L 63/14; H04L 63/1441; G06F 21/566; G06F 21/562
USPC ........................................................ 726/25
See application file for complete search history.

(56) References Cited

U.S. PATENT DOCUMENTS

| | | |
|---|---|---|
| 6,324,647 B1 | 11/2001 | Bowman-Amuah |
| 8,423,483 B2 | 4/2013 | Sadeh-Koniecpol et al. |
| 8,468,244 B2 | 6/2013 | Redlich et al. |
| 8,484,741 B1 | 7/2013 | Chapman |
| 8,532,970 B2 | 9/2013 | White et al. |
| 8,566,938 B1 | 10/2013 | Prakash et al. |
| 8,635,703 B1 | 1/2014 | Belani et al. |
| 8,793,799 B2 | 7/2014 | Fritzson et al. |
| 8,966,637 B2 | 2/2015 | Belani et al. |

(Continued)

OTHER PUBLICATIONS

"Advanced Spam Filtering Options," Microsoft Exchange Online Help, posted at https://technet.microsoft.com (Jun. 26, 2015).

(Continued)

*Primary Examiner* — Jeffrey D. Popham
(74) *Attorney, Agent, or Firm* — Fox Rothschild LLP

(57) ABSTRACT

An electronic device will identify an electronic message received by a messaging client that is associated with a first recipient, and it will analyze the electronic message to determine whether the electronic message is a simulated malicious message. Upon determining that electronic message is a simulated malicious message, the device will identify an actuatable element in the electronic message. The actuatable element will include a service address. The device will modify the electronic message by appending a user identifier of the first recipient to the service address of the actuatable element. Then, when the actutable element is actuated, the system may determine whether the first recipient actuated the actuatable element or an alternate recipient did so based on whether the user identifier of the first recipient is still appended (or is the only user identifier appended) to the actuatable element.

10 Claims, 5 Drawing Sheets

(56) References Cited

U.S. PATENT DOCUMENTS

| | | | |
|---|---|---|---|
| 9,027,134 | B2 | 5/2015 | Foster et al. |
| 9,065,826 | B2 | 6/2015 | Colvin et al. |
| 9,118,702 | B2 | 8/2015 | MaCaulay |
| 9,143,476 | B2 | 9/2015 | Dreller et al. |
| 9,154,514 | B1 | 10/2015 | Prakash |
| 9,246,936 | B1 | 1/2016 | Belani et al. |
| 9,253,207 | B2 | 2/2016 | Higbee et al. |
| 9,262,629 | B2 | 2/2016 | Belani et al. |
| 9,280,911 | B2 | 3/2016 | Sadeh-Koniecpol et al. |
| 9,306,887 | B1 | 4/2016 | Brunetti et al. |
| 9,356,948 | B2 | 5/2016 | Higbee et al. |
| 9,373,267 | B2 | 6/2016 | Sadeh-Koniecpol et al. |
| 9,398,038 | B2 | 7/2016 | Higbee et al. |
| 9,501,746 | B2 | 11/2016 | Prakash |
| 9,667,645 | B1 | 5/2017 | Belani et al. |
| 9,749,360 | B1* | 8/2017 | Irimie ................. H04L 63/1483 |
| 2004/0107345 | A1 | 6/2004 | Brandt et al. |
| 2006/0004896 | A1 | 1/2006 | Nelson et al. |
| 2006/0053203 | A1 | 3/2006 | Mijatovic |
| 2006/0253906 | A1 | 11/2006 | Rubin et al. |
| 2007/0112714 | A1 | 5/2007 | Fairweather |
| 2007/0180525 | A1 | 8/2007 | Bagnall |
| 2007/0226796 | A1 | 9/2007 | Gilbert et al. |
| 2007/0245422 | A1 | 10/2007 | Hwang et al. |
| 2007/0271613 | A1 | 11/2007 | Joyce |
| 2008/0167920 | A1 | 7/2008 | Schmidt et al. |
| 2008/0222734 | A1 | 9/2008 | Redlich et al. |
| 2008/0254419 | A1 | 10/2008 | Cohen |
| 2008/0288330 | A1 | 11/2008 | Hildebrand et al. |
| 2010/0235918 | A1 | 9/2010 | Mizrahi et al. |
| 2010/0313266 | A1 | 12/2010 | Feng et al. |
| 2011/0167011 | A1 | 7/2011 | Paltenghe et al. |
| 2012/0124671 | A1 | 5/2012 | Fritzson et al. |
| 2012/0278887 | A1 | 11/2012 | Vitaldevara et al. |
| 2014/0199664 | A1 | 7/2014 | Sadeh-Koniecpol et al. |
| 2014/0230065 | A1* | 8/2014 | Belani ................. H04L 63/1433 726/25 |
| 2015/0067833 | A1 | 3/2015 | Verma et al. |
| 2015/0229664 | A1* | 8/2015 | Hawthorn ........... H04L 63/1433 726/25 |
| 2016/0057167 | A1 | 2/2016 | Bach |
| 2016/0119376 | A1 | 4/2016 | Scozzaro et al. |
| 2016/0164898 | A1 | 6/2016 | Belani et al. |
| 2016/0234245 | A1 | 8/2016 | Chapman |
| 2016/0301705 | A1* | 10/2016 | Higbee ............... H04L 63/1416 |
| 2016/0337401 | A1 | 11/2016 | Bendersky et al. |
| 2016/0344770 | A1 | 11/2016 | Verma et al. |
| 2017/0085584 | A1 | 3/2017 | Goutal |
| 2017/0195293 | A1 | 7/2017 | Dahan et al. |
| 2017/0195363 | A1 | 7/2017 | Dahan et al. |

OTHER PUBLICATIONS

Anderson et al., "A Development System for Model-Tracing Tutors", Nov. 18, 2008, Department of Psychology, Paper 78, Carnegie Mellon University Research Showcase.
Jagaric et al., "Social Phishing" ACM (Dec. 12, 2005).
Kumaraguru et al., "Protecting People from Phishing: The Design and Evaluation of an Embedded Training Email System", 2007, In Proceedings of the SIGCHI Conference on Human Factors in Computing Systems.
Kumaraguru et al., "Testing PhishGuru in the Real World", In Proceedings of the 2008 Symposium on Usable Privacy and Security (SOUPS 2008).
Kumaraguru et al., "Lessons From a Real World Evaluation of Anti-Phishing Training", 2008 Anti-Phishing Working Group e-Crime Researchers Summit.
"Message Header Analyzer," Microsoft Exchange Online Help, posted at https://technet.microsoft.com (Mar. 29, 2013).
Microsoft, "Prevent False Positive of Email Marked as Spam with a Safelist or Other Techniques," posted at httpr://support.office.com, accessed Jun. 6, 2016.
Mitrovic et al., "Evaluation of a Constraint-Based Tutor for a Database Language", International Journal of Artificial Intelligence in Education (1999), 10, 238-256.
NIST, "Risk Management Framework (RMF) Overview," published Apr. 3, 2013.
Sheng et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.
Wishwanath et al., "Why Do People Get Phished? Testing Individual Differences in Phishing Vulnerability with an Integrated, Information Processing Model." Mar. 3, 2011.
The web page http://threatsim.com/how-it-works, as published Jan. 15, 2012.
Burri, N., Thesis: "Spamato, a Collaborative Spam Filter System" Swiss Federal Institute of Technology Zurich, Nov. 4, 2003.
Schlachter, S., Thesis: "Spamato Reloaded, Trust, Authentication and More in a Collaborative Spam Filter System" Swiss Federal Institute of Technology Zurich, Feb. 18, 2004.
Wombat Security Technologies, Inc, "Case Study: Carnegie Mellon University—A Multi-Pronged Approach to Combat Phishing" dated Mar. 2011.
Wombat Security Technologies, Inc., "PhishGuru: Operations Manual" dated Aug. 30, 2010.
Wombat Security Technologies, Inc., "PhishPatrol—A Purpose-built Filter to Catch Those Crafty Spear Phishing Emails That Make It Past Other Email Security" dated Apr. 2012.
Wombat Security Technologies, Inc., "PhishPatrol™ SpamAssassin Plugin Operations Manual" dated May 1, 2011.
Wombat Security Technologies, Inc., "Anti-Phishing Phyllis Training Game, Teaches Employees How to Identify Traps in Emails" dated 2011.
Wombat Security Technologies, Inc., "Anti-Phishing Phyllis™ Instructions" dated 2010.
Albrecht, K., Dissertation: "Mastering Spam A Multifaceted Approach with the Spamato Spam Filter System" submitted to the Swiss Federal Institute of Technology Zurich, dated 2006.
Albrecht, K. et al., "Spamato—An Extendable Spam Filter System" CEAS 2005—Second Conference on Email and Anti-Spam, Jul. 21-22, 2005, Stanford University, California.
Wombat Security Technologies, Inc., "PhishGuru Best Practices" 2012.
Wombat Security Technologies, Inc., "Leading Computer Science University Takes Multi-Pronged Approach to Combat Phishing; Deploys Wombat Security's Highly Effective Suite of Training and Filtering Products" dated Mar. 10, 2011, available at: https://www.wombatsecurity.com/press-releases/leading-computer-science-university-takes-multi-pronged-approach-combat-phishing.
Wombat Security Technologies, Inc., "An Empirical Evaluation of Phishguru™ Embeded Training" dated Apr. 2009.
Rashid, F.Y., "Review of Wombat Security Technologies PhishGuru™" PCMag.com, dated May 16, 2014, available at http://uk.pcmag.com/security-reviews/53269/news/phishguru.
Burns, M.B. et al., "What Kind of Interventions Can Help Users from Falling for hishing Attempts: A Research Proposal for Examining Stage-Appropriate Interventions" 46th Hawaii International Conference on System Sciences (HICSS), IEEE, Jan. 7-10, 2013, pp. 4023-4032.
Jansson, K. et al., "Simulating Malicious Emails to Educate End Users on-Demand" 3rd Symposium on Web Society (SWS), IEEE, Oct. 26-28, 2011, pp. 74-80.
Kumaraguru, P. et al., "Lessons From a Real World Evaluation of Anti-Phishing Training" eCrime Researchers Summit, IEEE, Oct. 15-16, 2008, 12 pages.
"How to Spear Phish Your Employees" Parts 1-3, posts by DAFT HACK, Feb. 3 and 7, 2014 (14 pages), obtained online, Jul. 20, 2018, at http://www.dafthack.com/blog/howtospearphishyouremployeespart1thesetup ; http://www.dafthack.com/blog/howtospearphishyouremployeespart2testingfunctionality ; https://sites.google.com/a/dafthack.com/dafthack/blog/howtospearphishyouremployeespart3hooklineandsinker.

\* cited by examiner

DETERMINING AUTHENTICITY OF REPORTED USER ACTION IN CYBERSECURITY RISK ASSESSMENT

BACKGROUND

To assess cybersecurity risks, organizations often desire to determine which users of the organization's computer network and connected devices are most likely to fall victim to a cybersecurity attack. A common way in which a user may expose a system to cybersecurity risk is by falling for a phishing email or other phishing message that asks the user to provide information or take action and ultimately enables unauthorized third parties to access to the organization's systems.

To assess this risk, organizations are increasingly using simulated phishing campaigns to identify users who are most likely to fall for an actual phishing message. A typical campaign involves sending a simulated malicious message to a group of users and identifying those users who may fall for a trap in the fake message (which is sometimes referred to as falling for, or "failing," the simulated phish). The trap can come in the form of a fake malicious link in the content of the message, a fake malicious attachment, or a fake malicious request for sensitive information. A cybersecurity risk assessment campaign is a campaign that includes directing simulated phishing messages and/or other cybersecurity-related lures to users in order to assess the users' likelihood of falling for the lures and thus exposing systems or data to malware, data breaches, or other cybersecurity risks.

Businesses that conduct simulated phishing campaigns depend on accurate results in order to get the most value out of their efforts. For example, it is common for an organization that conducts a simulated phishing campaign to measure the number of times that a user failed simulated phishing campaigns. Current approaches of measuring this are not always accurate, as they can track whether or not a particular simulated phish was failed, but they cannot always determine whether the user who failed the simulated phish was actually the intended recipient who was the target of the simulated phishing message.

This document describes a solution that can help identify whether a simulated malicious message has reached an intended recipient, or whether the message has been forwarded to or otherwise been acted upon by someone else.

SUMMARY

In an embodiment, an electronic device executes programming instructions to implement a method of authenticating a user-reported action in a cybersecurity risk assessment campaign. The method may include identifying an electronic message received by a messaging client that is associated with a first recipient, and analyzing the electronic message to determine whether the electronic message is a simulated malicious message. Upon determining that an electronic message is a simulated malicious message, the device may identify an actuatable element in the electronic message. The actuatable element may include a service address. The device may modify the electronic message by appending a user identifier of the first recipient to the service address of the actuatable element to yield a modified message with a modified actuatable element.

Optionally, the electronic device may receive a command to forward the electronic message to a second recipient. When executing the command to forward the electronic message to the second recipient, the device may forward the modified message with the modified actuatable element to the second recipient.

Optionally, the actuatable element may include a user identifier of a second recipient. If so, then when modifying the electronic message by appending the user identifier of the first recipient to the service address of the actuatable element, this process may yield a modified actuatable element that includes both the user identifier of the first recipient and the user identifier of the second recipient. Alternatively, this process may include removing the user identifier of the second recipient from the actuatable element and replacing it with the user identifier for the first recipient.

Optionally, determining whether the electronic message is a simulated malicious message may include determining whether any header field of a header section of the electronic message starts with a predetermined key. For any header field that starts with the predetermined key, the device may further analyze that header field to determine whether a value that follows the predetermined key satisfies a first trusted sender rule. If the value that follows the predetermined key satisfies the first trusted sender rule, the device may determine that the electronic message originated from a trusted sender and is a simulated phishing message.

Optionally, the device may detect that the first recipient has actuated the actuatable element. In response to detecting this, the device may further modify the electronic message by appending to the modified actuatable element a token that indicates that the first recipient actuated the modified actuatable element, or by otherwise modifying the electronic message to include a token that indicates that the first recipient actuated the modified actuatable element.

In some embodiments, a cybersecurity analyzer server may receive a service request at the service address. The cybersecurity analyzer server may be separate from the messaging client, or the cybersecurity analyzer server and messaging client may be parts of a common system. The service request may include the user identifier of the first recipient. If so, then in response to receiving the service request, the server may generate a record indicating that the first recipient fell for the simulated malicious message. Alternatively, the service request includes a user identifier of a second recipient and not the user identifier of the first recipient user. If so, then in response to receiving the service request, the server may not generate a record indicating that the first recipient fell for the simulated malicious message.

In some embodiments, when a cybersecurity analyzer server detects that an actuatable element has been actuated, it may deliver a training action based on the action taken and which entity took the action. If the actuation was by the first recipient, the cybersecurity analyzer server may cause a training action of a first type to be delivered to the first recipient, wherein the first type is a type that is directed to training the first recipient to avoid falling victim to malicious messages. If the actuation was by an alternate recipient, then the cybersecurity analyzer server may cause a training action of a second type to be delivered to the first recipient, wherein the second type is a type that is directed to training the first recipient to avoid forwarding malicious messages.

In an alternate embodiment, in a method of authenticating a user-reported action in a cybersecurity risk assessment campaign, a first messaging client will: (i) identify an electronic message received by the messaging client, wherein the electronic message is associated with an intended recipient; (ii) receive a command to forward the electronic message to an alternate recipient; and (iii) analyze the electronic message to determine whether the electronic message is a simulated malicious message. Upon determining that electronic message is a simulated malicious message, the first messaging client will identify an actuatable element in the electronic message. The actuatable element includes a service address. The first messaging client will modify the electronic message by appending a user identifier of the intended recipient to the service address of the actuatable element to yield a modified message with a modified actuatable element, and it will forward the modified message to the alternate recipient. A second messaging client will receive the modified electronic message (i.e., the message that is intended to be forwarded the alternate recipient) and further modify the modified electronic message by appending a user identifier of the alternate recipient to the service address of the actuatable element.

In an alternate embodiment, in a method of verifying authenticity of a user-reported action in a cybersecurity testing campaign, a message origination server may execute programming instructions that cause the message origination server to generate a simulated malicious message that includes an actuatable element, wherein the actuatable element includes a service address, and it will send the simulated malicious message to an account of an intended recipient. A cybersecurity analyzer server may execute programming instructions that cause the cybersecurity analyzer server to receive a service request for the service address, determine that the service request includes a user identifier, and determine whether the user identifier of the service request is a user identifier of the intended recipient. If the user identifier of the service request is the user identifier of the intended recipient, the server will generate a record indicating that the intended recipient actuated the actuatable element. Otherwise, the server will determine (and optionally record) that the simulated malicious message was forwarded to an alternate recipient and not generate a record indicating that intended recipient actuated the actuatable element.

DETAILED DESCRIPTION

Figure 1:
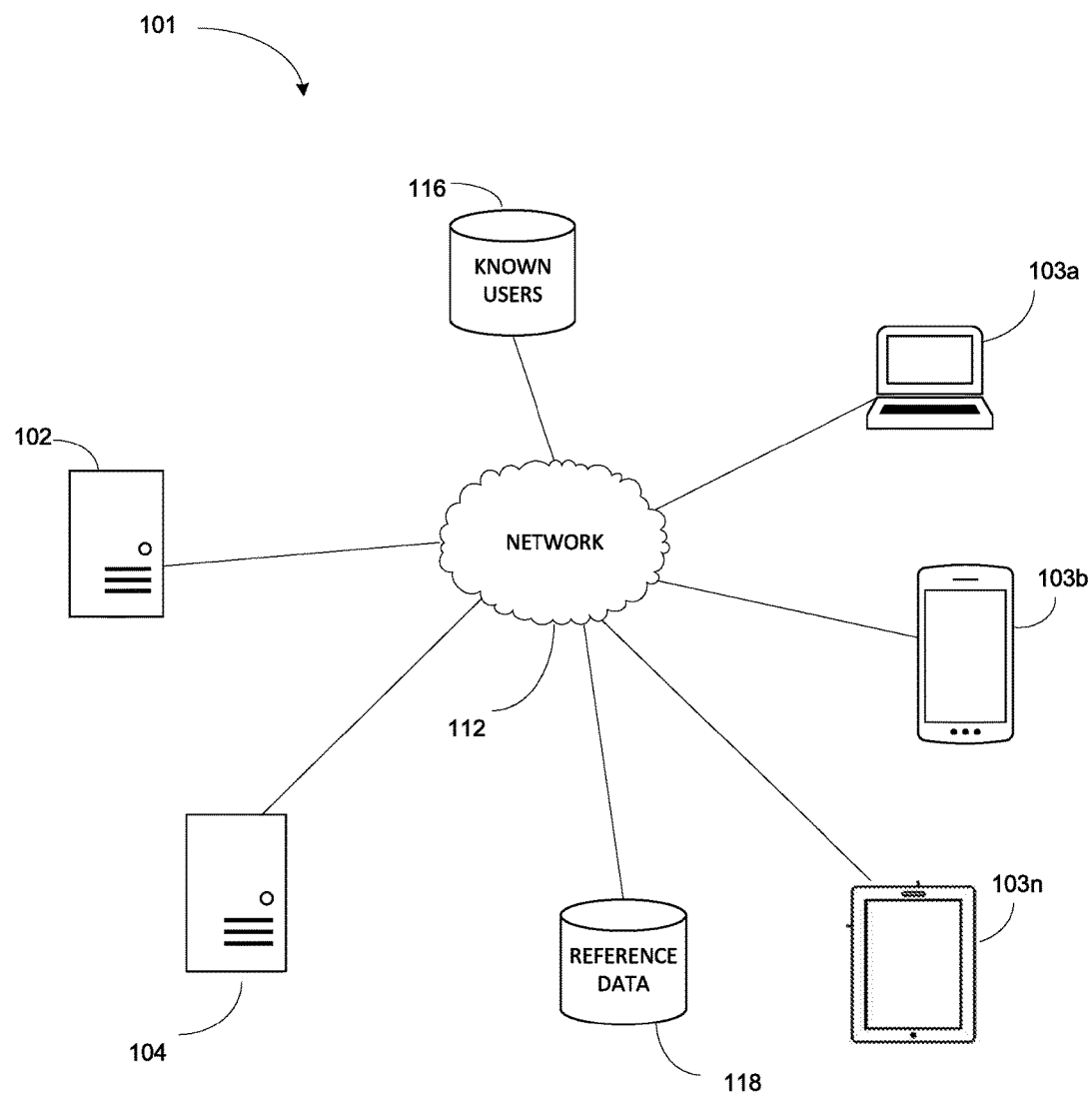
FIG. 1 illustrates various example elements of a system for assessing cybersecurity risk associated with various users of an organization's computer network.

In this document, the singular forms "a," "an," and "the" include plural references unless the context clearly dictates otherwise. In this document, the term "comprising" and its variants means "including, but not limited to." In this document, when the terms "first" and "second" are used to modify a noun, such use is simply intended to distinguish one item (such as one message recipient) from another, and is not intended to require a sequential order unless specifically stated. Unless defined otherwise, all technical and scientific terms used in this document have the same meanings as commonly understood by one of ordinary skill in the art.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 5.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the term "malicious message" refers to a message containing an actuatable element that, if actuated by a recipient of the message, can put the recipient or the recipient's organization at risk by harming computer networking equipment, destroying or altering stored data, transmitting stored data or otherwise making the data accessible to a third party, causing the recipient's messaging client to automatically forward the message or generate and send other malicious messages to the recipient's contacts, or taking some other action that compromises network, data or network-connected device security. Examples of actuatable elements include: (1) attachments that, if opened or selected, will cause the user's computing device to execute a malicious action; and (2) hyperlinks or HTML click event handlers that link to websites or Internet addresses that contain malicious functions such as functions that invite the recipient to enter login credentials or disclose other sensitive information while appearing to be a legitimate website, functions that cause malware to be downloaded to the recipient's electronic device, or functions that prompt the recipient to carry out some action that will compromise system or data security.

Conversely, a legitimate or non-malicious message is a message that is not malicious. The determination that a message is non-malicious (or legitimate) may be the result of an automated analysis, including an analysis to determine whether the sender of the message is a trusted sender, or whether the message is a simulated malicious message, or it may be the result of a more comprehensive analysis that looks at a broader set of attributes associated with a message (e.g., detection of malware in an attachment, detection of malicious hyperlinks in a message, age of the domains associated with hyperlinks in a message, reputation of the registrar associated with different hyperlinks in a message, language used in the message, information included in the header of a message, etc.). It could be based on statistical models or models built using machine learning techniques or sets of hand-crafted rules, or a combination of the above.

In this document, the term "simulated malicious message" refers to a message containing one or more elements that are configured to test, train or assess an electronic user's adherence to safe cybersecurity practices. Simulated malicious messages contain one or more elements that are the same as or similar to those that may be found in actual malicious messages. These elements are designed to emulate lures used in actual malicious emails to lead the user into performing one or more actions that can compromise the user's, a computer system's or a network's security and/or allow a third party to access sensitive information about the user or the user's organization. Examples of simulated malicious messages include: simulated phishing emails or text messages; spoofing messages that appear to originate from a known entity or an official entity (such as a government agency or financial institution); emails containing mock malicious executables or other mock malicious attachments; and/or other electronic messages containing a prompt intended to lure the user to initiate an action on the user's device that could compromise system or data security if the message were actually malicious. Examples of such actions include, and are not limited to, clicking on a simulated malicious hyperlink, opening a simulated malicious attachment, calling a simulated malicious number, or otherwise taking an action that, if the message were an actual malicious message, would disclose sensitive information to a sender of the message or compromise data or computer system security.

In this document, the term "trusted entity" or "trusted sender" refers to a person or system that is known to or considered by the user, to the user's messaging client, or to a cybersecurity analyzer server as an entity that is highly unlikely to send an actual malicious message to the user.

In this document, a "user identifier" is any identifier that is associated with and can be used to uniquely identify an intended or alternate recipient of a message, such as a user ID, a device ID for an electronic device that is associated with the recipient or the recipient's account (as stored in a data store that is available to the system), a client ID for a messaging client or other software application that is associated with the recipient or the recipient's account, or another unique identifier that directly or indirectly identifies the recipient. If the recipient is not a known user of the system (which may be the case for an alternate recipient), then the system may generate a user identifier for the non-user recipient, or it may use a default userID that is associated with more than one non-user recipient.

In this document, the term sender policy framework (or SPF) refers to a Domain Name System (DNS) text entry which shows a list of servers that are considered to be permitted to send messages for a specific domain. SPF is a DNS entry and can also considered a way to enforce the fact that the list is authoritative for the domain, since an entity's administrators may be the only people allowed to add/change that list's domain entries.

In this document, the term Domain Keys Identified Mail (DKIM) refers to an email authentication method designed to allow the email receiver to check that an email claimed to come from a specific domain was indeed authorized by the owner of that domain. This is achieved by an implementation of a public/private key signing process. The embodiments of this document encompass both DKIM as it is known at the time of this filing and future updates to the DKIM method that become generally accepted in the art.

In this document, the term Domain-based Message Authentication, Reporting & Conformance (DMARC) refers an email authentication protocol, and represents a collection of techniques that are designed to verify the identity of a sender of a message. DMARC may utilize the SPF and DKIM protocols and adds a reporting and policy function that allows senders and receivers to review if the mail messages adhered to the attributes of a specific domain. The embodiments of this document encompass both DMARC as it is known at the time of this filing and future updates to the DMARC method that become generally accepted in the art.

With reference to FIG. 1, in one embodiment, a cybersecurity network 101 includes a message origination server 102, one or more client computing devices 103a . . . 103n, and a cybersecurity analyzer server 104. The message origination server 102 is a computing device that includes a processor and programming instructions that are configured to cause the processor to generate or select and send one or more simulated malicious messages to one or more of the client devices via one or more wired or wireless networks 112. The simulated malicious messages may be simulated phishing emails and/or other electronic messages (such as emails, short messaging service (SMS), MMS, instant messages, in-channel messages delivered by a service such as a social networking site, or electronic messages delivered using some other messaging technology) containing a prompt intended to lure the user to click a simulated malicious hyperlink, open a simulated malicious attachment, call a simulated malicious number, disclose sensitive information, or otherwise carry out (or not carry out) an action whose performance (or non-performance) would put systems or data of the user or the user's organization at risk. The cybersecurity analyzer server 104 is a computing device with a processor and programming instructions that are configured to enable the server to receive, process, classify and forward messages that it receives from client computing devices. The message origination server 102 and the cybersecurity analyzer server 104 may be separate devices as shown, or they may be functional components that are part of a common electronic device or system.

In various embodiments, the cybersecurity analyzer server 104, the message origination server 102, or both may have access to a user database 116 containing identifying information about one or more users of the system that may receive messages and report the messages to the cybersecurity analyzer server. Information in the user database may include a message delivery address (e.g., email address), social media account information, mobile device phone number, or the like. The system may also include or have access to one or more remote or client-installed data sets of reference data 118 that the cybersecurity analyzer server or a client computing device may access when analyzing and classifying messages. The reference data may include trusted senders, messages or message components previously received from trusted senders, domain registrar information, or other information, examples of which will be described in more detail below.

Each client computing device (e.g., 103*a*) includes a messaging client that receives electronic messages, including but not limited to the simulated malicious messages originating from the message origination server 102, and presents the messages to the user for review via a user interface. Examples of messaging clients include e-mail clients, SMS messaging clients, social media messaging applications, or other client applications that receive and display messages for the device's user to review. A messaging client may be associated with a user account for any of the users in the user database 116. Association of a messaging client with a user account may occur when the user logs into the messaging client, such as by presenting an authentication credential (username/passcode, biometric identifier, etc.). When a messaging client of a client computing device receives a simulated malicious message from the message origination server, the messaging client will cause the client device to present the simulated malicious message to the device's user, such as by displaying it on a display screen or generating and presenting an audio output that speaks the contents of the simulated malicious message. Optionally, the simulated message may be presented in a context that is the same at that in which legitimate messages are presented, such as in the user's commonly-used electronic messaging client.

A standard method of generating simulated malicious messages includes embedding an identifier into a link or other actuatable element contained in the message. This constitutes a form of authentication, where the actuatable element is pre-authenticated with a token. Anyone who presents that token to a service gains access to the service as the user for whom the message was intended. In the case of a simulated phishing email, this causes any actions taken on those links to be associated with the original (or "intended") recipient of the email. This can have negative consequences if the intended recipient is not the one who failed the simulated phish but rather an alternate recipient to whom the intended recipient forwarded the message, as this approach would falsely record the intended recipient as the user who is at risk rather than the user who actually failed the simulated phish. For instance, forwarding of a message may happen based on an action of the intended recipient, or an action of a messaging client such as an automatic forwarding rule. If the alternate recipient (rather than the intended recipient) fails the phish, the intended recipient may as a result be enrolled in follow-up training or be targeted with some other remediation action, even though he or she may not really need the training, whereas the user who truly requires the training (i.e., the alternate recipient) may not be enrolled. Forwarding of a message may happen based on an action of the intended recipient, or an action of a messaging client such as an automatic forwarding rule.

This document proposes a solution that can help determine whether, when a simulated malicious message is acted upon by a recipient, the action was taken by the intended recipient or by an alternate recipient to whom the intended recipient forwarded the message. It allows a messaging client to identify a simulated malicious message and determine whether or not the message has been forwarded. If the message is forwarded, the identifier in the actuatable element will be modified so that any action taken on the message with the modified actuatable element will be attributed to the recipient of the forwarded message, and not the original recipient of the message.

Figure 2:
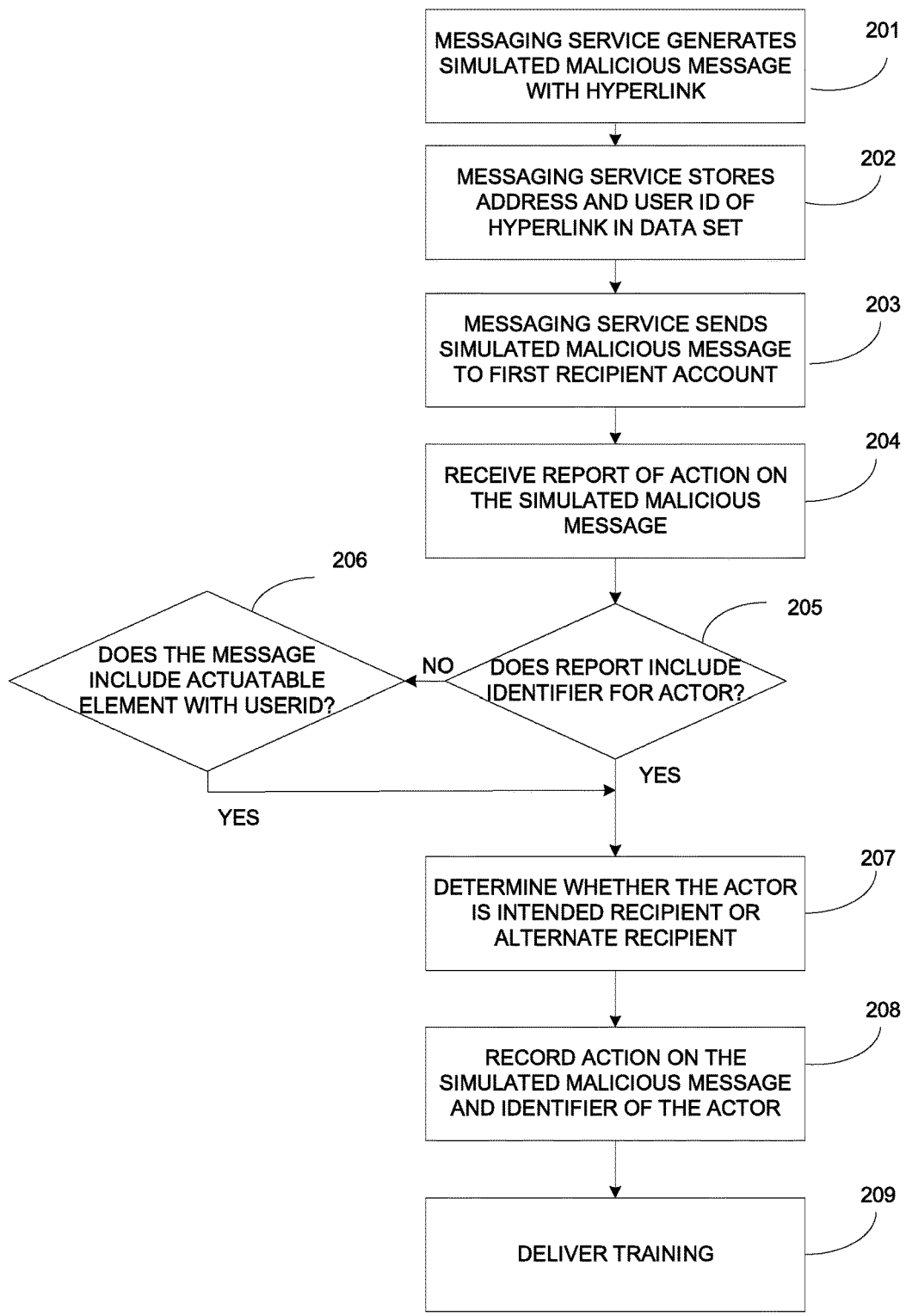
FIG. 2 illustrates various actions that a cybersecurity risk assessment service may execute in various embodiments.

An example of how this may occur is described in FIG. 2. In this process, a messaging origination server acts as a messaging service by generating a simulated malicious message 201 that includes a hyperlink or other actuatable element. Optionally, the hyperlink is personalized to a particular user in that it includes a unique service address and/or a user identifier that are each associated with the intended recipient. In this example and in the discussion below, a hyperlink is used as an example, but the message may include any actuatable element. Optionally, the actuatable element also may include a personalized service address and/or a user identifier that is associated with the intended recipient, whether it be an actual hyperlink, an attachment that executes a service call to the service address when opened, or another type of actuatable element. An example of a personalized service address is the hypothetical hyperlink https://www.corp-internal.com/aaaaa?userid 987 654, which includes a service address (https://www.corp-internal.com//aaaaa) followed by a query string and a user identifier for the intended recipient of the message (userid987654).

If a unique service address or user identifier is used, the messaging service will store the service address and/or user identifier in a data set in association with the intended recipient 202 so that when a user actuates the hyperlink, the system will receive a service call at the service address and then check the data set to identify the intended recipient as the user who actuated the hyperlink.

When generating a simulated malicious message 201, the system also may include an identifier that the messaging client can use to determine that the message is a simulated malicious message from a trusted sender. For example, phishing messages may contain one or more headers each containing various header fields and values to be used by the computing device (either on server or client device) to process the phishing message. For example, the phishing message server may generate simulated phishing emails with a key-value pair that consists of the phrase "X-Mailer: Known Mailer" in which X-Mailer is the key and Known Mailer is the value. In other examples, the phishing message server may generate simulated phishing emails, each of which includes key-value pairs that include a known key followed by a globally unique identifier (GUID), where the GUID is unique to the user to whom the message was sent, unique to the sender, which has a predetermined known format, or which is paired with one or more additional GUIDs that satisfy one or more of these rules. The messaging client may use this information to determine that a message is a simulated phishing message, as described in more detail below.

The messaging service will send the simulated malicious message to an account of the first recipient 203 so that the message may be received by a messaging client of an electronic device that the first recipient_uses.

Figure 3:
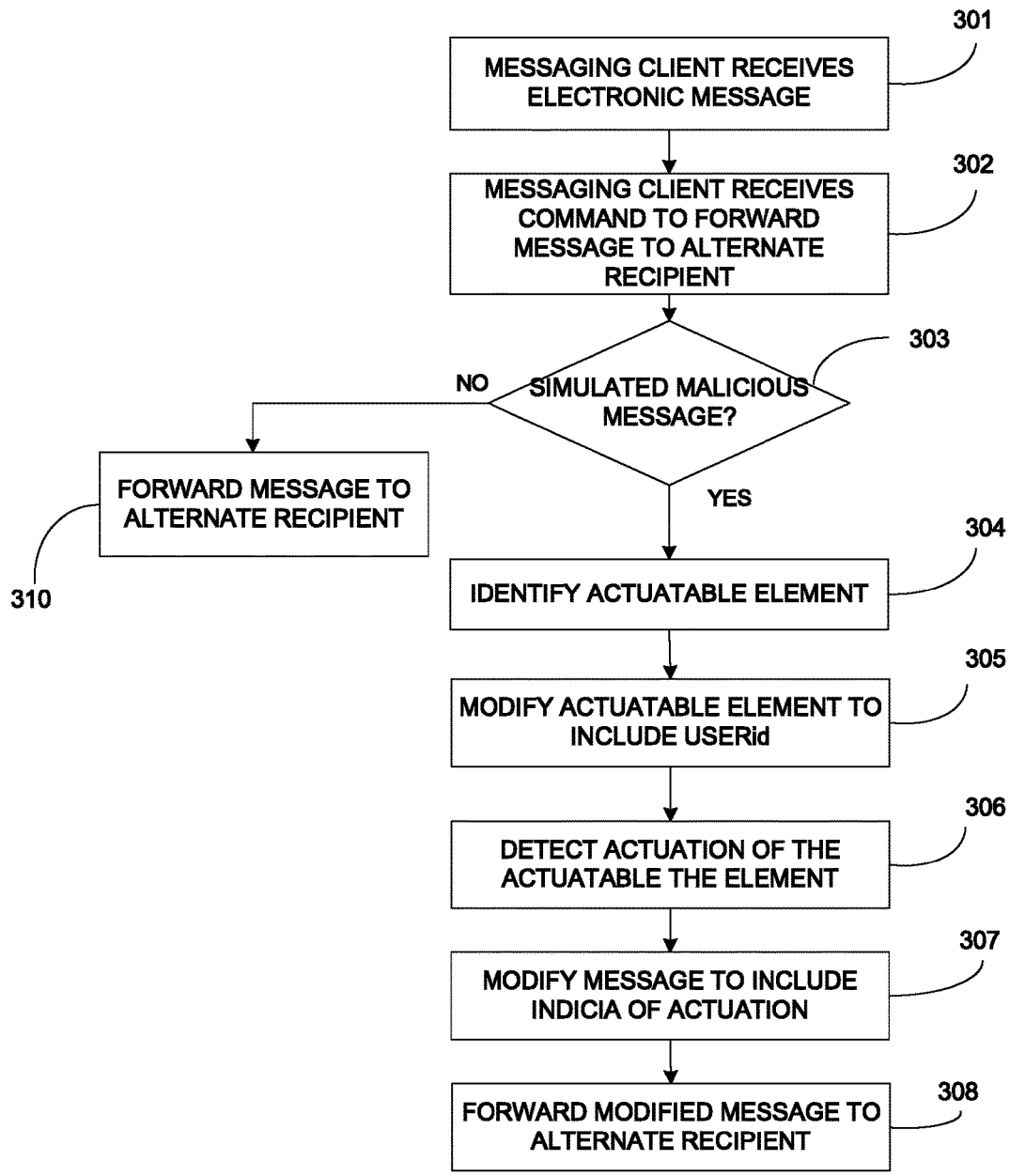
FIG. 3 illustrates various actions that a client device may execute in various embodiments.

Referring to FIG. 3, after the messaging client of the intended recipient receives the simulated malicious message or other type of electronic message 301, the client may receive a command to forward the message to an alternate recipient 302. As discussed above, this command may be initiated by the intended recipient, or it may be automatically initiated based on one or more rules (such as an out-of-office automatic forwarding rule).

The messaging client (or another local application) will include programming instructions, such as in the form of a plug-in or associated application, that will analyze the message before acting on the forwarding command to determine whether it is a simulated malicious message that originated from a trusted sender 303, or whether it is another type of message such as a legitimate message, a likely actual malicious message, or some other category of message. Although this analysis is described as being performed at the level of the client computing device running the messaging client, in an alternative embodiment it is contemplated that the analysis could be performed at the level of a remote server, or a combination of both. It may also involve accessing one or more internal and external sources of information such as information from domain registrars, blacklists, servers maintaining reputation information, malware repositories (including repositories of malware signatures), caches storing some of this information or pre-computed metrics intended to facilitate the detection of malicious and legitimate messages (e.g., signatures of known malicious messages, who-is data, statistics about the number of hyperlinks found in different types of malicious and legitimate messages, reputation of different domain registrars, etc.). In addition, this analysis may be done in response to receiving a forwarding command, in response to receiving a user actuation of the actuatable element, or at any time upon or after receipt of the electronic message.

To determine whether a message is a simulated malicious message, the messaging application (or a remote server, if the messaging application forwards the message to the remote server for analysis), will interrogate the headers and/or body of the message in order to determine if it is a simulated malicious message. For example, the system may examine any or all of the following identifiers in an email to determine whether to classify the email as a simulated phish: (1) X-header; (2) e-mail body identifier; (3) DKIM, SPF, or DMARC header; (4) "from" header; or (5) Internet protocol (IP) address. The presence of one or more of these headers, or the correspondence of any one or more of these identifiers to known values may qualify a message as being a simulated malicious message. Optionally, the known values may be stored in the reference database described above in FIG. 1. For DKIM, SPF, or DMARC headers, in addition to the header being present, it may be necessary to evaluate the value of the header to ensure the message originated from a trusted sender via the message body identifier. For the "from" header, the domain of the "from" header may be compared to a list of known simulated phishing domains to determine the source of the message.

Figure 4:
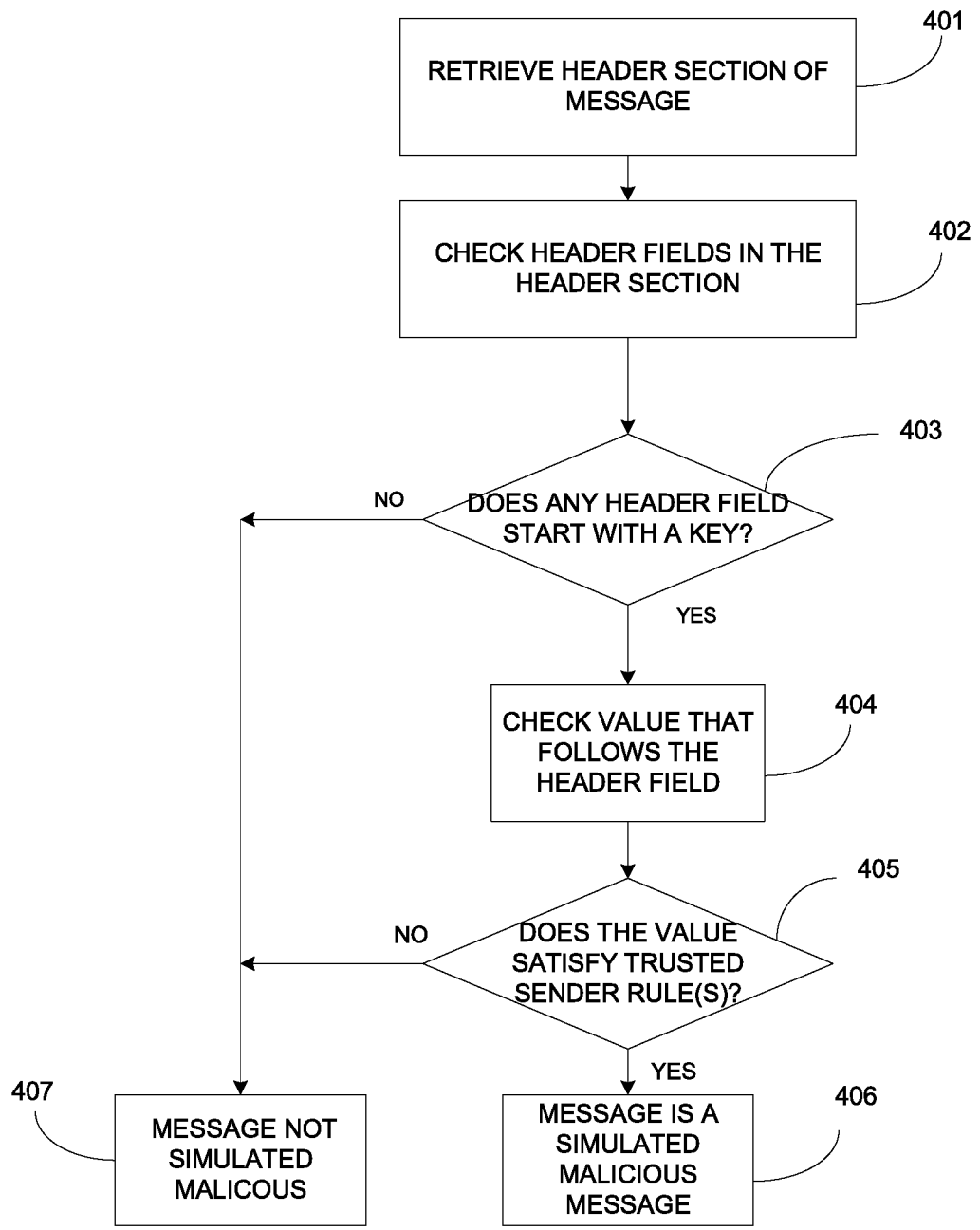
FIG. 4 illustrates an example process for determining whether an electronic message is a simulated malicious message.

With reference to FIG. 4, in one embodiment, a method of determining whether a message is a simulated malicious message may include retrieving one or more header fields (which may include an actual header field and/or an identifier within a header) of a header section of the message 401, checking the one or more header fields 402, and determining whether any header field of a header section of the received message starts with a predetermined key 403. If a header field starts with the predetermined key, the method will include further checking the value that follows the header field 404, and determining whether the value that follows the predetermined key satisfies a trusted sender rule 405. If the value that follows the header field satisfies the trusted sender rule, the system may determine that the message is a simulated malicious message 406; otherwise, the system may determine that the message is not a simulated malicious message 407. If the system determines that no header field of any header section of the received messages starts with any predetermined key, it may also determine that the message is not a simulated malicious message 407.

Returning to FIG. 3, after determining that the message is a simulated malicious message, the messaging client (or other local application or remote service) will analyze the message to identify an actuatable element in the message 304, and it may then modify the actuatable element 305 and forward the modified message to the alternate recipient 308.

To identify an actuatable element in the message 304, the system may search for a known contiguous string of characters in the actuatable element. For example, simulated phishing hyperlinks typically follow a preset pattern. This is done so that processing systems are able to uniquely map requests that are made based on actions of the end user to whom the message was sent, and ultimately the user who received the email. Since uniform reference locators (URLs) are contiguous strings it is possible to search for a static phrase to find the links. Consider the example:

https://www.corp-internal.com/t/aaaaa

In the above example, searching for "aaaaa" would have a high likelihood of returning the simulated phishing links, but not other links or extraneous text in the email since it is a phrase that is unlikely to be used in other places in the email. A more robust solution may also choose to validate that in the text extracted, in this case we would look to extract all character data before and after the pattern up to the first white space characters, that other patterns exists, such as https://, or a dot corn. This would help to reduce the likelihood of extracting text that is not a simulated phishing link.

An alternate implementation uses regular expressions pattern matching. Regular expressions are a string searching technique that allow for the expression of dynamic phrases. For example, rather than searching for the static pattern "aaaaa", the system may search for the pattern https://, followed by any number of characters, followed by the phrase ".com/t/", followed by between 6 and 12 alphanumeric characters. This may allow the system to succinctly describe multiple conditions that must be met in order for text to be considered a match.

If the messaging client does not determine that the message is a simulated malicious message, it may then simply forward the message to the alternate recipient 308 without modification.

To modify the actuatable element 305, the system may append a unique user identifier to the message, optionally after a query string. The user identifier will be uniquely associated with the user whose messaging application is analyzing the message at the time. For example, the system may modify the example actuatable element https://www.corp-internal.com/t/aaaaa so that it is then https://www.corp-internal.com/t/aaaaa?userid987654.

Optionally, when a user actuates an actuatable element in a simulated malicious message 306, the programming that is used with the messaging client also may modify the message to include indicia that the cybersecurity analyzer server or a subsequent messaging client can use to identify that the user failed the phish or otherwise fell for the simulated malicious message 307. For example, when an intended recipient clicks on a hyperlink in a simulated phishing message (and this fails the phish), the messaging client could be programmed to modify the message to add an authenticating token to the message, such as by appending the token to the hyperlink of the actuatable element or otherwise including the token in the message. (Example: www.corp-internal.com/abc123&token=32h3aa4.) The token may include a unique predetermined or calculated value that would be verifiable by the messaging client and the cybersecurity analyzer server, but not to other services such as a sandbox that may intercept the simulated malicious message before it reaches the intended recipient. For example, if authentication token has a value that is known to the cybersecurity analyzer server, or if it follows a format that is known to the cybersecurity analyzer server, the authentication token will be verifiable by the cybersecurity analyzer server. In this way, when a user fails a phish the system can be sure that the failure was actually that of the intended recipient and not an intermediary such as a sandbox or other automated service. If the service request includes the authentication token, the system may use this as confirmation that the intended recipient fell for the simulated malicious message, otherwise it will presume that the simulated message was intercepted and it will not record that the intended recipient fell for the simulated malicious message.

If the system determines that a user identifier was already present in the URL, which may occur if the message had been forwarded by another email client prior to receipt by this user, the system may modify the actuatable element to include to either replace the user identifier (userid) query string parameter with one that is representative of the current user, or to append an identifier for the current user after that of the previous (intended) recipient of the message. By adding this parameter it becomes possible to link an action on a simulated malicious message to both the original (intended) recipient of the message, as well as the current (alternate) recipient.

In some embodiments, when an end user using a messaging application actuates a user interface element which causes the messaging application to forward a message, such as by clicking a "forward email" button, the application may execute code to determine if the message that is to be forwarded is a simulated malicious message. If the message is determined to be a simulated malicious message, the system may then execute code to extract a unique identifier for the message. If the unique identifier is found, the messaging application (or a related local application) may then communicate with a network device to record that the end user is attempting to forward the specific simulated malicious message. If the messaging application cannot communicate with a networking device (such as a cybersecurity service), or if it does not receive confirmation that the remote server received the information to be recorded, the messaging application add-in may be configured to record the information locally so that the information can be sent to the network device later. Optionally, the messaging application's add-in then may be configured to stop the messaging application from forwarding the message to the alternate recipient until this information can be reported to the network device. Optionally the messaging application may cause the electronic device to output a prompt that informs the user that he or she is attempting to forward a simulated malicious message, and it may ask the user to confirm that he or she wants to do this. If the messaging application is not configured to prevent forwarding, the email client will then forward the email.

Before forwarding the message, the messaging application may alter the forwarded email to include one or more of the following identifiers:
X-header;
message body identifier;
DKIM, SPF, or DMARC header; or
"from" header.

When the alternate recipient's messaging application receives the forwarded email, the alternate recipient's messaging application will execute the same process described above to identify whether the message is a simulated malicious message, report to the cybersecurity server that it has received the message, and modify one or more links contained in the email to include a personal identifier of the alternate recipient.

The network device(s) in this example are responsible for sending the simulated malicious messages, and for recording the receipt and responses to the simulated phish malicious messages. These can be a single device or multiple devices. For recording the receipt of a simulated malicious message, the network device expects to receive at a minimum two pieces of data, a unique identifier for the message, and a unique identifier for the user receiving the email. Upon receiving the report of a forwarded message, the network device will record this in a data store. For this purpose, a data store could be something like temporary read/write memory, a more permanent store like a file on a file system, or a database. This information will be used when a response to a simulated phish is received.

Returning to FIG. 2, when the system receives a report of an action being taken on a simulated malicious message 204, such a user as clicking a link, opening an attachment or viewing the message, then in addition to the type of action the user is taken, the report may also contain a unique identifier of the message. Optionally, a unique identifier of the user taking the action will also be included. When the report is received, the system will use the data that has been stored by the report forwarding system to determine if this message has potentially been forwarded 205. This may be done by determining whether the service request includes a user identifier that has been appended to a hyperlink 206. In the case where a unique user identifier is present, then the system can compare that identifier to the identifier of the original recipient of the email that was stored when the email was sent, in order to determine who is taking action on the message, and attribute the action to the correct individual 207. If there is no unique user identifier present, this is indicative of someone having received the email that does not have the functions described above installed on their device, such as in an add-in for an email client. The system would then determine, based on the unique identifier, whether the email had been forwarded previously. If it has not been recorded as being forwarded, the event would be tracked and attributed to the original recipient of the message. If it has been previously recorded as being forwarded, then the actuation event would not be attributed to the original recipient but would be recorded as having occurred by an alternate recipient, although the system also may record that the intended recipient forwarded the message.

Ultimately, the result may be recorded 208, and the resulting record may be used to determine whether or not the intended recipient (or perhaps the alternate recipient) should receive additional assessment and/or training, and to deliver the training to that user 209. Other data that may be included in the record include information such as: (i) date/time that the simulated malicious message was sent; (ii) date/time that the simulated malicious message was received by the user who failed the message; (iii) identification data for the intended recipient (such as name, email address, telephone number, account user identification, and/or IP address); (iv) whether the message included an attachment; (v) if there was an attachment, the attachment type; (v) the date/time that the simulated malicious message was forwarded to the alternate recipient; (vi) the date/time that the simulated malicious message was received by the alternate recipient; and (vii) identification data for the alternate recipient (such as name, email address, telephone number, account user identification, and/or IP address).

When determining whether to deliver training to a user 209 after the system detects actuation of the actuation element, the system may select and deliver a type of training that corresponds to the action that the intended recipient and/or alternate recipient took on the message. For example, if the intended recipient acted upon the message's actuation element (such as by clicking a link or opening an attachment), the system may select and deliver the intended recipient training activities that are directed to help the intended recipient avoid falling victim to actual malicious messages. The same type of training may be delivered to the alternate recipient if the alternate recipient failed the simulated malicious message. In some embodiments, if the system detects that an alternate recipient failed the simulated malicious message, the system still may select and deliver training to the intended recipient, but in this situation the training would be directed to helping the intended recipient avoid forwarding actual malicious messages.

The examples described in this document describe a process in which a first (or intended) user forwards a message to a second, or alternate, user. However, it is intended that the embodiments described above could cover any number of message forwarding events, and the "first" or "intended" recipient can thus be any recipient who forwards a message to another recipient, even if the first recipient originally received the message from yet another recipient.

Figure 5:
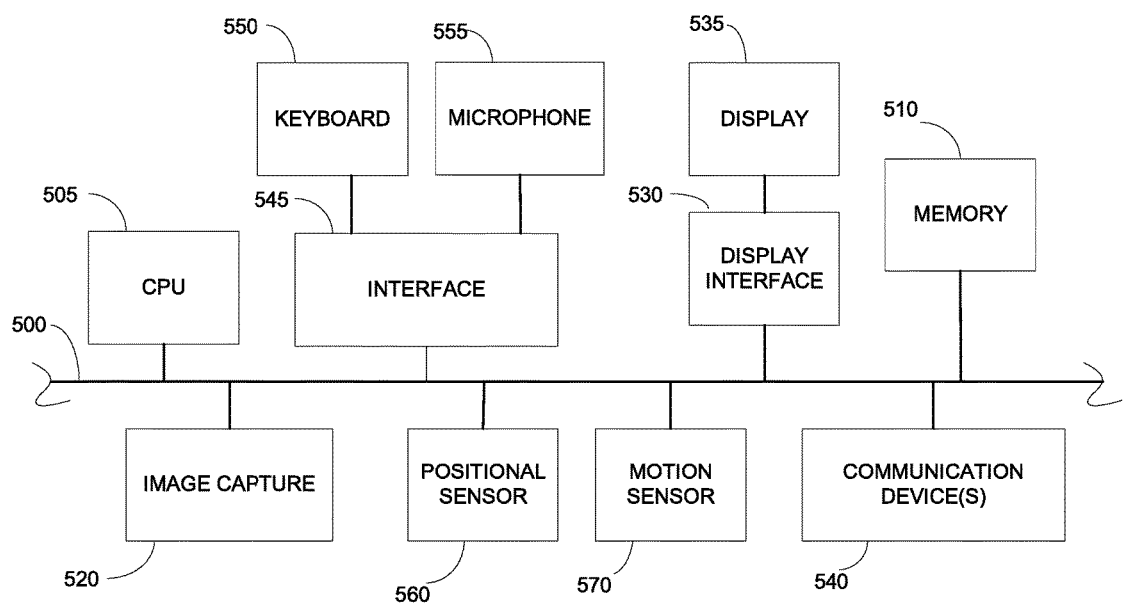
FIG. 5 illustrates example embodiments of one or more electronic devices for implementing the various methods and processes described in this document, such as features of a client device or a message origination server.

FIG. 5 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 500 serves as an information highway interconnecting the other illustrated components of the hardware. The bus may be a physical connection between elements of the system, or a wired or wireless communication system via which various elements of the system share data. Processor 505 is a processing device of the system performing calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 510 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 535 in audio, visual, graphic or alphanumeric format. Communication with external devices, such as a printing device, may occur using various communication devices 540, such as a communication port or antenna. A communication device 540 may be communicatively connected to a communication network, such as the Internet or an intranet.

The hardware may also include a user input such as a keyboard or keypad 550, or other input device such as a mouse, a touch pad, a touch screen, a remote control, a pointing device, or a video input device. The hardware also may include a microphone 555 for receipt of voice and other audio inputs. Data also may be received from an image capturing device 520 such as a digital camera or video camera. A positional sensor 560 and/or motion sensor 570 may be included to detect position and movement of the device. Examples of motion sensors 570 include gyroscopes or accelerometers. Examples of positional sensors 560 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of authenticating a user-reported action in a cybersecurity risk assessment campaign, the method comprising:
by an electronic device that includes a messaging client that is associated with a first recipient and that is configured to receive electronic messages, executing programming instructions that cause the electronic device to:
identify an electronic message that is directed to the first recipient and received by the messaging client;
receive a command for the messaging client to forward the electronic message from the first recipient to a second recipient;
analyze the electronic message to determine whether the electronic message is a simulated malicious message;
upon determining that electronic message is a simulated malicious message:
identify an actuatable element in the electronic message, wherein the electronic message also comprises content other than the actuatable element, and
modify the electronic message by appending a user identifier to the actuatable element, which results in a modified message with a modified actuatable element; and
cause the messaging client to forward the modified message with the modified actuatable element to the second recipient.

2. The method of claim 1, wherein modifying the electronic message by appending a user identifier to the actuatable element comprises appending a user identifier of the first recipient to a service address.

3. The method of claim 1, wherein:
the actuatable element also comprises a user identifier of the first recipient; and
modifying the electronic message by appending a user identifier to the actuatable element comprises appending the user identifier of the second recipient to the actuatable element with the user identifier of the first recipient.

4. The method of claim 1, wherein:
the actuatable element also comprises a user identifier of the first recipient; and modifying the electronic message by appending a user identifier to the actuatable element comprises removing the user identifier of the first recipient from the actuatable element and replacing the user identifier of the first recipient with the user identifier of the second recipient.

5. The method of claim 1, wherein determining whether the electronic message is a simulated malicious message comprises:
   determining whether any header field of a header section of the electronic message starts with a predetermined key;
   for any header field that starts with the predetermined key, further analyzing that header field to determine whether a value that follows the predetermined key satisfies a first trusted sender rule; and
   if the value that follows the predetermined key satisfies the first trusted sender rule, determining that the electronic message originated from a trusted sender and is a simulated malicious message, otherwise not determining that the electronic message is a simulated malicious message.

6. The method of claim 1, further comprising, by the electronic device:
   detecting that the first recipient has actuated the actuatable element; and
   in response to the detecting, further modifying the electronic message by appending to the actuatable element a token that indicates that the first recipient actuated the actuatable element.

7. The method of claim 1, further comprising, by the electronic device:
   detecting that the first recipient has actuated the actuatable element; and
   in response to the detecting, further modifying the electronic message to include a token that indicates that the first recipient actuated the actuatable element.

8. The method of claim 1, further comprising, by a cybersecurity analyzer server:
   receiving a service request at a service address that is in the actuatable element, wherein the service request includes the user identifier; and
   in response to receiving the service request, generating a record indicating that a recipient who is associated with the user identifier fell for the simulated malicious message.

9. The method of claim 1, further comprising, by a cybersecurity analyzer server:
   receiving a service request at a service address that is in the actuatable element, wherein the service request includes a user identifier of the second recipient and not a user identifier of the first recipient.

10. The method of claim 1, further comprising, by a cybersecurity analyzer server:
   detecting actuation of the modified actuatable element;
   if the actuation was by the first recipient, causing a training action of a first type to be delivered to the first recipient, wherein the first type is a type that is directed to training the first recipient to avoid falling victim to malicious messages; and
   if the actuation was by an alternate recipient, causing a training action of a second type to be delivered to the first recipient, wherein the second type is a type that is directed to training the first recipient to avoid forwarding malicious messages.

* * * * *